Aug. 1, 1950  M. E. NORDBERG  2,517,019
GRADED SEAL
Filed Sept. 24, 1948
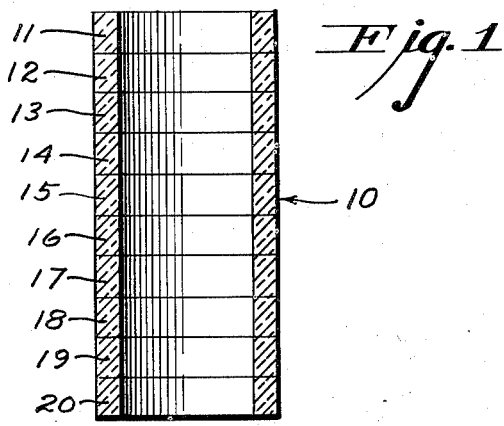
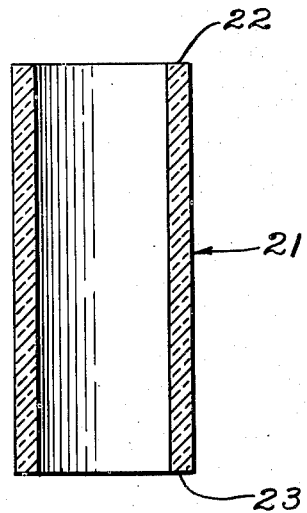
INVENTOR.
MARTIN E. NORDBERG
BY
ATTORNEY Patented Aug. 1, 1950

2,517,019

UNITED STATES PATENT OFFICE 2,517,019

GRADED SEAL

Martin E. Nordberg, Corning, N. Y., assignor to Corning Glass Works, Corning, N. Y., a corporation of New York Application September 24, 1948, Serial No. 50,977

15 Claims. (Cl. 49—92)

This invention relates to the joining of two glasses, or a glass and a metal, where the materials being joined have expansion coefficients differing too widely to permit their direct union. It is particularly directed to the provision of an improved graded seal for this purpose.

Graded seals can be made by suitably mixing a pulverized low expansion glass and a pulverized high expansion glass in proportions varying progressively from 100% of one to 100% of the other, molding the resulting mixture to shape by a method such as that described in U. S. Patent 2,390,354, and firing. Seals made in this manner, however, possess a more or less widely varying deformation temperature range since a high expansion glass is generally softer than a glass of lower expansion. In the production of such seals it is necessary therefore to use special techniques, such as gradient or two-stage firing, to avoid deformation of the softer end and to insure firing of the harder end. This objectionable feature is accentuated in such a seal in which a glass having an expansion on the order of 15 or less is used because the softening or deforming temperature rises sharply as the expansion decreases in the lower expansion ranges. (As used herein, the terms "expansion" and "expansion coefficient" are synonymous. The numerical expression of the expansion refers to the mean linear coefficient of thermal expansion in cm./cm./°C. between 0° and 300° C. Since the true value of the expansion coefficient is a minute fraction, it is expressed herein as a whole number for convenience, the whole number representing the true value multiplied by $10^7$.)

It is the primary purpose of this invention accordingly to produce, by this powder technique, a graded seal having a substantially uniform deformation temperature and consequently capable of being fired at a uniform temperature. It is a further purpose of the present invention to produce such a seal in which the composition varies progressively either stepwise or continuously.

To these and other ends, my invention comprises a graded seal prepared by the powder technique and composed of a vitreous mixture of a low expansion glass, a higher expansion glass, and a ceramic refractory material, proportioned progressively from a region of low expansion to a region of high expansion such that the deformation temperature is uniform throughout, the graded seal and its method of preparation to be more fully described hereinafter in connection with the accompanying drawing in which:

Fig. 1 is a sectional elevation of one form of a tubular graded seal prepared in accordance with my invention, and Fig. 2 is a sectional elevation of another form of tubular graded seal prepared in accordance with my invention.

I have found that the deformation temperature of a powdered glass may be markedly increased by the addition of a ceramic refractory material thereto and that, by properly proportioning the two ingredients, a mixture having a deformation temperature substantially the same as that of a lower expansion glass can be produced. I have also found that, by combining the lower expansion glass with such mixture in suitably varying proportions, a series of compositions having a progressively increasing expansion and having a substantially uniform deformation and firing temperature can be obtained. The graded seal of the present invention is prepared from all or a selected portion of such a series of compositions.

The glasses employed in my new graded seals may be of any well-known type such as silicate, borate, or phosphate, it being desirable that they do not readily devitrify when heated. The low expansion glass may be the same as the low expansion glass to which the seal is to be united in service or it may have a slightly higher expansion. From a practical standpoint, the low expansion glass generally has an expansion on the order of 15 or below since a graded seal in which the low expansion glass has a higher expansion can usually be made equally as well by known means. Suitable low expansion glasses include those glasses containing over 95% silica and having an expansion less than 8 as well as fused silica itself.

The higher expansion glass has an expansion coefficient considerably greater than that of the low expansion glass, and the higher expansion glass to be used in any particular seal is determined by the other components of the seal and the expansion range to be bridged, as will become apparent in the further description of the present invention. In practice, it has been found that it is generally unnecessary to use a glass having an expansion of less than about 30 for this purpose.

The ceramic refractory material employed must not fuse or melt below the firing temperature of the graded seal and should melt at a higher temperature than either the low expansion glass or the higher expansion glass. Those ceramic materials which I have found especially suited for the present purpose include the refractory oxides and silicates, among which I have successfully employed, by way of example, alumina, zircon, kaolin, zirconia, and magnesia. Aluminous refractories, and alumina in particular, are desirable because they reduce the tendency of certain glasses to devitrify during firing.

In the preparation of my graded seal, the several ingredients are suitably pulverized, desirably separately, and then combined in the appropriate proportions to produce a series of compositions having expansions varying progressively from a low expansion to a high expansion and generally ranging from the low expansion glass through mixtures of the three ingredients to a mixture of the higher expansion glass and the ceramic refractory material and all possessing substantially the same deformation temperature. The expansions of the ingredients are roughly additive according to the volume percentages employed, assuming that appreciable chemical reaction or solution does not take place therebetween, and it is thus readily possible to determine the proportions to be used throughout a particular seal. If appreciable solution or reaction does occur between the ingredients, corrections well known to anyone skilled in the art can be made. While sufficient refractory material may be added to the high expansion glass to raise the deformation temperature of the resulting mixture above that of the low expansion glass, there is no advantage in doing so to any material extent since gradient firing difficulties are then again introduced.

The proportions in which the several ingredients are present throughout the seal may vary stepwise or continuously as desired. In the former case the seal may be conveniently prepared in sections as follows: The pulverized higher expansion glass and refractory material are blended together as by ball milling for one-half hour in the proportions necessary to raise the deformation temperature of the mixture to the desired level. Individual blends are then made by progressively adding the pulverized low expansion glass to this base mixture with ball milling of each individual blend to secure proper mixing. All or a selected portion of the resulting series of blends is now individually granulated with a suitable binder and compressed into the desired shape; and such shaped bodies are then combined and fired to a non-porous state, a temperature of 1400°–1450° C. being generally satisfactory for this purpose. A tubular graded seal 10 prepared in this manner and composed of ten annular sections 11 to 20 of progressively varying expansions is shown in Fig. 1.

Where the specific gravities of the several ingredients are all within a narrow range, such a ten-section graded seal may be conveniently prepared in accordance with the following relation, in which X represents the percentage of ceramic refractory material initially added to the higher expansion glass to raise its deformation temperature:

| Section No. | Ceramic Refractory | High Expansion Glass | Low Expansion Glass |
|---|---|---|---|
| | Per cent | Per cent | Per cent |
| 11 | X | (100-X) | 0 |
| 12 | 0.9X | (90-0.9X) | 10 |
| 13 | 0.8X | (80-0.8X) | 20 |
| 14 | 0.7X | (70-0.7X) | 30 |
| 15 | 0.6X | (60-0.6X) | 40 |
| 16 | 0.5X | (50-0.5X) | 50 |
| 17 | 0.4X | (40-0.4X) | 60 |
| 18 | 0.3X | (30-0.3X) | 70 |
| 19 | 0.2X | (20-0.2X) | 80 |
| 20 | 0.1X | (10-0.1X) | 90 |

If the lower expansion glass has a coefficient of expansion higher than that of the glass to which the low expansion end of the seal is to be united, it may be necessary or desirable to attach an additional section, composed entirely of the low expansion glass, to the low expansion end of the seal.

The number of sections employed is governed by the particular seal to be made, and is advantageously so chosen that the stresses introduced by the expansion differences between sections are not large enough to cause fracture. The shape and size of the graded seal determine to a considerable extent the expansion difference permissible between sections. I have found, for example, that ten sections will successfully join materials where the expansion differential does not exceed about 50, that is, about 5 points difference between consecutive sections. In extreme cases this difference between consecutive sections may be as large as 10 points for very small seals or as small as 1 point for very large seals, such as a 3-inch diameter tubular seal. In some cases, at least, a progressively greater expansion difference between sections may be tolerated as the expansion of the seal increases. In such cases the proportioning of the ingredients may be varied accordingly if desired.

Graded seals of the continuously varying type may be made by any suitable continuously proportioning means, such as the rectangular box having a diagonal partition shown in Patent No. 1,173,688. The space on one side of such partition is filled with a mixture composed of the powdered higher expansion glass and the ceramic refractory in the desired proportions, and the space on the other side of the partition is filled with the powdered low expansion glass. The partition is then removed and the entire contents of the box are transversely mixed, after which the mixture is molded to shape and fired. The diagonal partition may be curved instead of straight, whereby a variable rather than uniform rate of change of expansion coefficient results. This may be desirable in cases where the permissible rate of change increases from the low expansion end of the graded seal to the high expansion end, as previously mentioned.

A tubular graded seal 21 of this type, having a high expansion end 22 and a low expansion end 23, is shown in Fig. 2. The composition of end 22 may correspond to that of section 11 in Fig. 1, and the composition of end 23 may correspond to that of section 20. This graded seal differs from the graded seal 10 of Fig. 1 in that the composition and expansion coefficient of the seal 21 vary gradually and uniformly from the end 22 to the end 23 with no line of demarcation while its deformation temperature remains substantially uniform throughout. The principal advantage of this type of graded seal is the virtual elimination of stresses due to expansion differences.

The graded seals prepared according to this invention, when properly fired, are dense, non-porous, sintered bodies, mechanically strong and vacuum-tight. Upon firing, the glasses soften and sinter together to form a glassy matrix in which particles of the ceramic refractory are agglomerated or suspended in a substantially unfused condition. The suspended unfused refractory particles exert a stiffening effect on the glassy matrix, with a resultant increase in the deformation temperature thereof.

The following examples are illustrative of my invention:

*Example I*

The materials used were a glass containing approximately 96.5% $SiO_2$, 3% $B_2O_3$, and 0.5% $Al_2O_3$ and having an expansion of 8, another glass having the approximate composition $SiO_2$ 75%, $Al_2O_3$ 15%, $Na_2O$ 10%, and an expansion of 60, and a refractory oxide comprising alumina (expansion of approximately 65). An intimate mixture of the high expansion glass (60%) and the alumina (40%) was prepared by ball milling ½ hour, and this mixture was then blended with increasing amounts of the low expansion glass. Ten separate blends were so made by substituting the low expansion glass in 10% steps as previously described and were granulated by adding a suitable binder as shown in Patent No. 2,390,354, mentioned above. A tubular graded seal such as is shown in Fig. 1 was formed by compressing the several blends to shape and firing at 1400° C., no appreciable deformation being observed. The expansion of this seal varied from 8 to 60, the difference in expansion between each section being about 5.

This graded seal can be used to join fused silica (expansion of 5) to tantalum (expansion of 65).

Example II

A graded seal for uniting fused silica to tungsten (expansion of 45) was made by following the procedure of Example I except that the first three sections on the high expansion end (corresponding to sections 11, 12, and 13 of Fig. 1) were omitted. The last section of the seal (corresponding to section 14 of Fig. 1) contained 30% low expansion glass, 42% high expansion glass, and 28% alumina, and had an expansion of 45.

Example III

Fused silica was sealed to a borosilicate glass of expansion 36 by using a seal containing only the first five sections of the low expansion end of the seal of Example I, that is, sections 16–20 of Fig. 1. The high expansion end of the seal (section 16) had an expansion of about 35 and contained 50% low expansion glass, 30% high expansion glass, and 20% alumina.

Example IV

Graded seals were made as described in Examples I, II, and III, except that the high expansion glass had the approximate composition $SiO_2$ 73%, $B_2O_3$ 12%, $Na_2O$ 12%, and $Al_2O_3$ 3% and an expansion of 60.

Example V

A graded seal having an expansion range from 8 to 50 was made by using a high expansion glass of approximate composition $SiO_2$ 78%, $B_2O_3$ 13%, $Na_2O$ 3%, $Al_2O_3$ 4%, $BeO$ 2% and expansion 31 in equal proportions with alumina and adding the low expansion glass of Example I in 10% steps. The procedure of making the seal was the same as in Example I. Such a seal may be used for joining fused silica with a glass having an expansion of 50 to 55.

Example VI

A seal for joining fused silica or the low expansion glass of the seal of Example V to borosilicate glasses of approximate expansion 48 may be made by omitting the first two sections of the high expansion end of the seal of Example V so that the composition of the high expansion end is 40% high expansion glass, 40% alumina and 20% low expansion glass, the expansion of the composition being about 42.

Example VII

A high expansion glass having the same composition as the high expansion glass used in Example V was combined with Florida kaolin (expansion of about 33) in the ratio of 1 part of glass to 9 parts of kaolin, and the low expansion glass described in Example I was substituted in 10% steps, according to the procedure in Example I. The resulting seal had an expansion range of 8 to 33.

Example VIII

A mixture of 60% zircon (expansion of about 40) and 40% of the high expansion glass of Example V was blended with the low expansion glass of Example I in the manner described in the latter example to produce a graded seal having an expansion range of 8 to 35. Such a seal is suitable for joining fused silica to borosilicate glasses having an expansion of 35 to 38.

Examples II, III, and VI illustrate a variation of my invention in which the ingredients used in making the seal are proportioned so as to form compositions covering a wide expansion range and a seal is made by selecting a plurality of consecutive compositions from the larger group to make the desired seal. Such a procedure is very useful when seals of varying expansion ranges are being made and it is desired to keep the number of different ingredients being used at a minimum.

Although graded seals made in accordance with this invention are illustrated in the drawing as being tubular in shape, it will be apparent that they also may take other shapes, such as rods or disks, and it is to be understood that such other shapes are herein contemplated and are to be included within the scope of the appended claims.

I claim:

1. A graded seal composed of a vitreous mixture of a low expansion glass, a higher expansion glass, and a ceramic material melting at a higher temperature than said glasses and selected from the group consisting of refractory oxides and silicates, the ceramic material being substantially present as unfused particles agglomerated in a matrix of the glasses, said seal consisting of a selected portion of a series of compositions having expansions varying progressively from a low expansion to a high expansion and ranging from the low expansion glass through mixtures of the low expansion glass, the higher expansion glass, and the ceramic material to a mixture of the higher expansion glass and the ceramic material, the proportions of the ingredients in such mixtures being such that the deformation temperature is substantially uniform throughout.

2. The graded seal as claimed in claim 1, in which the range of compositions varies continuously from the low expansion glass to the mixture of the higher expansion glass and the ceramic material.

3. A graded seal composed of a plurality of sections, the compositions of which comprise a selected portion of a series of vitreous compositions having expansions varying progressively from a low expansion to a high expansion and ranging from a low expansion glass through mixtures of the low expansion glass, a higher expansion glass, and a ceramic material to a mixture of the higher expansion glass and the ceramic material, the ceramic material melting at a higher temperature than said glasses and being selected from the group consisting of refractory oxides and silicates and being substantially present as unfused particles agglomerated in a matrix of the glasses, the proportions of the ingredients in such mixtures being such that the deformation temperature is substantially uniform throughout.

4. The graded seal as claimed in claim 3, in which the compositions of intermediate expansion comprise the low expansion glass containing the admixture of the higher expansion glass and the ceramic material in successively increasing increments of equal size.

5. A graded seal composed of a vitreous mixture of a glass having an expansion not exceeding about 15, a glass having an expansion of at least 30, and a ceramic material melting at a higher temperature than said glasses and selected from the group consisting of refractory oxides and silicates, the ceramic material being substantially present as unfused particles agglomerated in a matrix of the glasses, said seal consisting of a selected portion of a series of compositions having expansions varying progressively from a low expansion to a high expansion and ranging from the low expansion glass through mixtures of the low expansion glass, the high expansion glass, and the ceramic material to a mixture of the high expansion glass and the ceramic material, the proportions of the ingredients in such mixtures being such that the deformation temperature is substantially uniform throughout.

6. The graded seal as claimed in claim 5, in which the ceramic material comprises alumina.

7. The graded seal as claimed in claim 5, in which the ceramic material comprises zircon.

8. The graded seal as claimed in claim 5, in which the ceramic material comprises kaolin.

9. The graded seal as claimed in claim 5, in which the low expansion glass comprises fused silica.

10. The graded seal as claimed in claim 5, in which the low expansion glass comprises a glass containing at least 95% silica and having an expansion less than 8.

11. A graded seal composed of a vitreous mixture of a low expansion glass, a higher expansion glass, and a ceramic material melting at a higher temperature than said glasses and selected from the group consisting of refractory oxides and silicates, the ceramic material being substantially present as unfused particles agglomerated in a matrix of the glasses, the proportions of such ingredients varying progressively from a region of low expansion to a region of high expansion such that the deformation temperature is substantially uniform throughout.

12. The graded seal as claimed in claim 11, in which the low expansion glass has an expansion not exceeding about 15, and the higher expansion glass has an expansion of at least 30.

13. A graded seal composed of a vitreous mixture of a low expansion glass, a higher expansion glass, and a ceramic material melting at a higher temperature than said glasses and selected from the group consisting of refractory oxides and silicates, the ceramic material being substantially present as unfused particles agglomerated in a matrix of the glasses, the region of highest expansion being composed of the higher expansion glass and a sufficient amount of the ceramic material to form a composition having a deformation temperature substantially the same as that of the region of lowest expansion, intermediate regions being composed of compositions containing the same ingredients as the composition of the highest expansion region in the same proportions and additionally containing progressively increasing amounts of the low expansion glass in proportions such that the deformation temperature is substantially uniform throughout.

14. The method of making a vitreous graded seal having a uniform deformation temperature throughout from a low expansion glass and a higher expansion glass, which comprises mixing the high expansion glass in powdered form with sufficient of a powdered ceramic material to produce a mixture having a deformation temperature substantially the same as that of the low expansion glass, the ceramic material melting at a higher temperature than said glasses and being selected from the group consisting of refractory oxides and silicates, separately mixing the low expansion glass in powdered form in progressively increasing amounts with said mixture in proportions to form a series of compositions having expansions varying progressively from a low expansion to a high expansion and having deformation temperatures substantially the same as that of the low expansion glass, molding a selected portion of said series of compositions to form an article of desired shape, and firing said article at a uniform temperature to integrally unite the same.

15. The method of making a graded seal as claimed in claim 14, in which the low expansion glass has an expansion not exceeding 15 and the higher expansion glass has an expansion of at least 30.

MARTIN E. NORDBERG.

REFERENCES CITED

The following references are of record in the file of this patent:

UNITED STATES PATENTS

| Number | Name | Date |
|---|---|---|
| 1,014,757 | Keyes | Jan. 16, 1912 |
| 1,136,504 | Brookfield | Apr. 20, 1915 |
| 1,173,688 | Thomson | Feb. 29, 1916 |
| 1,191,630 | Weintraub | July 18, 1916 |
| 2,197,562 | Reinker | Apr. 16, 1940 |
| 2,219,331 | Pirani | Oct. 29, 1940 |
| 2,219,332 | Pirani | Oct. 29, 1940 |
| 2,255,558 | Dalton | Sept. 9, 1941 |
| 2,443,318 | Lee et al. | June 15, 1948 |

FOREIGN PATENTS

| Number | Country | Date |
|---|---|---|
| 298,963 | Great Britain | Oct. 16, 1928 |
| 389,436 | Great Britain | Mar. 16, 1933 |
| 463,889 | Great Britain | Apr. 8, 1937 |